US008922108B2

(12) United States Patent
Hussell et al.

(10) Patent No.: US 8,922,108 B2
(45) Date of Patent: Dec. 30, 2014

(54) REMOTE COMPONENT DEVICES, SYSTEMS, AND METHODS FOR USE WITH LIGHT EMITTING DEVICES

(75) Inventors: Christopher P. Hussell, Cary, NC (US); Peter Scott Andrews, Durham, NC (US); Florin A. Tudorica, Durham, NC (US); David T. Emerson, Chapel Hill, NC (US)

(73) Assignee: Cree, Inc., Durham, NC (US)

( * ) Notice: Subject to any disclaimer, the term of this patent is extended or adjusted under 35 U.S.C. 154(b) by 617 days.

(21) Appl. No.: 13/038,109

(22) Filed: Mar. 1, 2011

(65) Prior Publication Data

US 2012/0223632 A1 Sep. 6, 2012

(51) Int. Cl.

| H01J 1/62 | (2006.01) |
|---|---|
| H01J 63/04 | (2006.01) |
| H01J 61/38 | (2006.01) |
| H01J 61/34 | (2006.01) |
| F21V 23/06 | (2006.01) |
| F21V 3/04 | (2006.01) |
| F21K 99/00 | (2010.01) |
| F21Y 101/02 | (2006.01) |

(52) U.S. Cl.
CPC . *F21K 9/56* (2013.01); *H01J 61/38* (2013.01); *H01J 61/34* (2013.01); *Y02B 20/19* (2013.01); *F21V 23/06* (2013.01); *F21K 9/90* (2013.01); *F21K 9/135* (2013.01); *F21Y 2101/02* (2013.01); *H01J 2261/385* (2013.01); *F21V 3/0481* (2013.01)
USPC ............................ 313/483; 362/649; 362/650

(58) Field of Classification Search
CPC ............. F21K 9/56; F21K 9/135; F21K 9/90; F21V 3/0481; F21V 23/06; H01J 61/38; H01J 61/34; H01J 2261/385; Y02B 20/19; F21Y 2101/02

USPC .......... 313/483, 110; 257/98, 99, 88; 362/84, 362/649, 650, 311.02, 249.02; 29/592.1
See application file for complete search history.

(56) References Cited

U.S. PATENT DOCUMENTS

| 4,946,547 A | 8/1990 | Palmour |
|---|---|---|
| 5,200,022 A | 4/1993 | Kong |

(Continued)

FOREIGN PATENT DOCUMENTS

| EP | 2 681 487 | 1/2014 |
|---|---|---|
| GB | 2 366 610 | 3/2002 |

(Continued)

OTHER PUBLICATIONS

International Search Report and Written Opinion for Application No. PCT/US2012/026763 dated Nov. 28, 2012.

(Continued)

*Primary Examiner* — Nimeshkumar Patel
*Assistant Examiner* — Glenn Zimmerman
(74) *Attorney, Agent, or Firm* — Jenkins, Wilson, Taylor & Hunt, P.A.

(57) ABSTRACT

Remote component devices, systems, and methods are disclosed. In one aspect, remote component devices, systems, and methods can include a body for lockably securing the remote component to a housing. Devices, systems, and methods can also include one or more light emitting devices disposed over the body. An optical material can be remotely located at least a first distance away from the one or more light emitting devices. Remote component devices, systems, and methods disclosed herein can be used as replacements and/or equivalent light products for standard filament light bulbs and compact fluorescent lamp (CFL) bulbs.

61 Claims, 9 Drawing Sheets

(56) References Cited

U.S. PATENT DOCUMENTS

| | | | |
|---|---|---|---|
| 5,210,051 A | 5/1993 | Carter, Jr. | |
| RE34,861 E | 2/1995 | Davis et al. | |
| 5,393,993 A | 2/1995 | Edmond | |
| 5,523,589 A | 6/1996 | Edmond | |
| 5,947,588 A | 9/1999 | Huang | |
| 5,951,153 A * | 9/1999 | Favela | 362/414 |
| 6,508,567 B1 * | 1/2003 | Fiene | 362/147 |
| 2005/0101181 A1 * | 5/2005 | Bohn | 439/501 |
| 2005/0194607 A1 | 9/2005 | Barnett et al. | |
| 2006/0186418 A1 | 8/2006 | Edmond | |
| 2008/0062703 A1 * | 3/2008 | Cao | 362/311 |
| 2008/0258130 A1 | 10/2008 | Bergmann | |
| 2008/0290814 A1 * | 11/2008 | Leong et al. | 315/294 |
| 2009/0161356 A1 | 6/2009 | Negley et al. | |
| 2009/0212698 A1 | 8/2009 | Bailey | |
| 2009/0213595 A1 * | 8/2009 | Alexander et al. | 362/373 |
| 2010/0207534 A1 * | 8/2010 | Dowling et al. | 315/186 |
| 2010/0264845 A1 | 10/2010 | Broitzman | |
| 2010/0314996 A1 | 12/2010 | Van de Ven et al. | |
| 2011/0068687 A1 * | 3/2011 | Takahasi et al. | 315/35 |
| 2011/0080096 A1 * | 4/2011 | Dudik et al. | 315/112 |
| 2011/0169394 A1 * | 7/2011 | Chowdhury et al. | 313/46 |
| 2011/0211351 A1 * | 9/2011 | Van De Ven et al. | 362/249.02 |
| 2011/0227102 A1 * | 9/2011 | Hussell et al. | 257/89 |
| 2012/0025235 A1 * | 2/2012 | Van De Ven et al. | 257/98 |
| 2012/0223632 A1 | 9/2012 | Hussell et al. | |

FOREIGN PATENT DOCUMENTS

| | | |
|---|---|---|
| JP | 2005-108700 | 4/2005 |
| JP | 2009-170114 | 7/2009 |
| KR | 10-0990332 | 10/2010 |
| WO | WO 2009/119038 | 10/2009 |
| WO | WO 2010090012 A1 * | 8/2010 |
| WO | WO 2010-128419 | 11/2010 |
| WO | WO 2010/128419 | 11/2010 |
| WO | WO 2012-161822 | 11/2012 |

OTHER PUBLICATIONS

Extended European Search Report for Application No. 12788994.7 dated Jul. 24, 2014.

* cited by examiner

US 8,922,108 B2

REMOTE COMPONENT DEVICES, SYSTEMS, AND METHODS FOR USE WITH LIGHT EMITTING DEVICES

TECHNICAL FIELD

The subject matter herein relates generally to remote component devices, systems, and methods for use with light emitting devices. More particularly, the subject matter herein relates to remote phosphor component devices, systems and methods for use with light emitting diodes (LEDs).

BACKGROUND

Solid state light sources, such as light emitting diodes (LEDs) can be used in various lighting products and lighting components for commercial and personal applications. Advantages of using LED lighting products include both increased energy savings and product lifetimes. For example, when LEDs are used as the light source in consumer products such as table and floor lamps, the lamps advantageously consume less energy than lamps using conventional filament light bulbs and even compact fluorescent light (CFL) bulbs. LED lighting products can be manufactured and marketed to consumers for replacing the standard A19 sized filament and CFL light bulbs. The A19 bulb is a standard, 2⅜ inch diameter pear-shaped light bulb most commonly used in household lighting products. One problem with current A19 equivalent light bulbs using LEDs is that the light emission is concentrated at top of the bulb. That is, the light is not multi or omnidirectional, but rather, light is mainly emitted from the top of the bulb only. This can make doing normal household activities, such as cleaning, reading, writing, or working at a computer more difficult to perform as surfaces below the bulb may not be illuminated and may be difficult to see. In addition, such products can require several soldered contacts and/or soldered electrical components which can increase manufacturing times.

Thus, a need remains for remote component devices, systems, and methods that are easy to manufacture, easy to use, and have improved, multidirectional lighting.

SUMMARY

The present subject matter relates to remote component devices, systems, and methods for use with light emitting devices. In one aspect, the subject matter herein relates to remote phosphor component devices, systems, and methods using light emitting diodes (LEDs). In one aspect, remote component devices, systems, and methods disclosed herein can provide energy efficient alternatives to conventional lighting products, such as the standard light bulb of any suitable size and/or shape. Devices, systems, and methods disclosed herein can also improve ease of use and ease of manufacturability of lighting products by using, for example, easy, solder free connections.

It is, therefore, an object of the present disclosure to provide novel remote component devices, systems, and methods and to improve the energy efficiency, usability, and manufacturability of lighting products. This and other objects of the present disclosure as can become apparent from the disclosure herein are achieved, at least in whole or in part, by the subject matter described herein.

DETAILED DESCRIPTION

Figure 1:
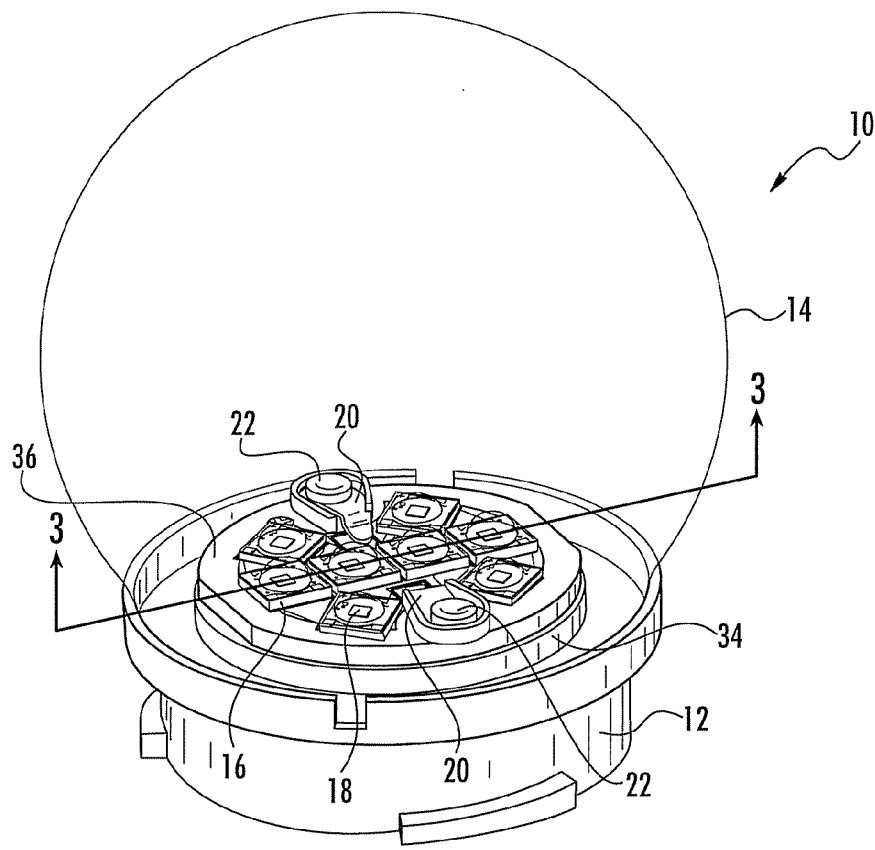
FIG. 1 is a perspective view showing a remote component device according to an embodiment of the present subject matter.

The present subject matter now will be described more fully hereinafter with reference to the accompanying drawings, in which embodiments of the subject matter are shown. The present subject matter may, however, be embodied in many different forms and should not be construed as limited to the specific embodiments set forth herein. Rather, these embodiments are provided to convey the scope of the subject matter to those skilled in the art. In the drawings, the size and relative sizes of layers and regions may be exaggerated for clarity.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, no intervening elements are present. It will also be understood that when an element is referred to as being "connected" or "coupled" to another element, it can be directly connected or coupled to the other element or intervening elements may be present. In contrast, when an element is referred to as being "directly connected" or "directly coupled" to another element, no intervening elements are present.

It will be understood that although the terms "first" and "second" are used herein to describe various regions, layers and/or portions, these regions, layers and/or portions should not be limited by these terms. These terms are only used to distinguish one region, layer or portion from another region, layer or portion. Thus, a first region, layer or portion discussed below could be termed a second region, layer or portion, and similarly, a second region, layer or portion may be termed a first region, layer or portion without departing from the teachings of the present subject matter.

Furthermore, relative terms, such as "lower" or "bottom" and "upper" or "top," may be used herein to describe relationship of one or more elements to other elements as illustrated in the Figures. It will be understood that relative terms are intended to encompass different orientations of the device in addition to the orientation depicted in the figures. For example, if a device in the figures is turned over, elements described as being on the "lower" side of other elements would then be oriented on "upper" sides of the other elements. The exemplary term "lower," can therefore, encompasses both an orientation of "lower" and "upper," depending of the particular orientation of the figure. Similarly, if the device in one of the figures is turned over, elements described as "below" or "beneath" other elements would then be oriented "above" the other elements. The terms "below" or "beneath" can therefore encompass both an orientation of above and below.

Unless otherwise defined, terms (including technical and scientific terms) used herein should be construed to have the same meaning as commonly understood by one of ordinary skill in the art to which this subject matter belongs. It will be further understood that terms used herein should be interpreted as having a meaning that is consistent with their meaning in the context of this specification and the relevant art, and should not be interpreted in an idealized or overly formal sense unless expressly so defined herein.

As used herein, the terms solid state light emitter or solid state light emitting device may include a light emitting diode (LED), laser diode and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials. Solid state light emitting devices according to embodiments of the subject matter may include III-V nitride (e.g., gallium nitride) based LEDs or lasers fabricated on a silicon carbide substrate, such as those devices manufactured and sold by Cree, Inc. of Durham, N.C. Such LEDs and/or lasers may be configured to operate such that light emission occurs through the substrate in a so-called "flip chip" orientation.

Light emitting devices according to embodiments described herein may comprise group III-V nitride (e.g., gallium nitride) based light emitting diodes (LEDs) or lasers fabricated on a growth substrate, for example, silicon carbide substrate, such as those devices manufactured and sold by Cree, Inc. of Durham, N.C. For example, Silicon carbide (SiC) substrates/layers can be 4H polytype silicon carbide substrates/layers. Other silicon carbide candidate polytypes, such as 3C, 6H, and 15R polytypes, however, may be used. Appropriate SiC substrates are available from Cree, Inc., of Durham, N.C., the assignee of the present subject matter, and the methods for producing such substrates are set forth in the scientific literature as well as in a number of commonly assigned U.S. patents, including but not limited to U.S. Pat. Nos. Re. 34,861; 4,946,547; and 5,200,022, the disclosures of which are incorporated by reference herein in their entireties.

As used herein, the term "Group III nitride" refers to those semiconducting compounds formed between nitrogen and one or more elements in Group III of the periodic table, usually aluminum (Al), gallium (Ga), and indium (In). The term also refers to binary, ternary, and quaternary compounds such as GaN, AlGaN and AlInGaN. The Group III elements can combine with nitrogen to form binary (e.g., GaN), ternary (e.g., AlGaN), and quaternary (e.g., AlInGaN) compounds. These compounds may have empirical formulas in which one mole of nitrogen is combined with a total of one mole of the Group III elements. Accordingly, formulas such as $Al_xGa_{1-x}N$ where $1>x>0$ are often used to describe these compounds. Techniques for epitaxial growth of Group III nitrides have become reasonably well developed and reported in the appropriate scientific literature, and in commonly assigned U.S. Pat. Nos. 5,210,051, 5,393,993, and 5,523,589, the disclosures of which are hereby incorporated by reference herein in their entireties.

Although various embodiments of LEDs disclosed herein comprise a growth substrate, it will be understood by those skilled in the art that the crystalline epitaxial growth substrate on which the epitaxial layers comprising an LED are grown may be removed, and the freestanding epitaxial layers may be mounted on a substitute carrier substrate or submount which may have better thermal, electrical, structural and/or optical characteristics than the original substrate. The subject matter described herein is not limited to structures having crystalline epitaxial growth substrates and may be used in connection with structures in which the epitaxial layers have been removed from their original growth substrates and bonded to substitute carrier substrates.

Group III nitride based LEDs according to some embodiments of the present subject matter, for example, may be fabricated on growth substrates (such as a SiC substrates) to provide horizontal devices (with both electrical contacts on a same side of the LED) or vertical devices (with electrical contacts on opposite sides of the LED). Moreover, the growth substrate may be maintained on the LED after fabrication or removed (e.g., by etching, grinding, polishing, etc.). The growth substrate may be removed, for example, to reduce a thickness of the resulting LED and/or to reduce a forward voltage through a vertical LED. A horizontal device (with or without the growth substrate), for example, may be flip chip bonded to a carrier substrate or printed circuit board (PCB), or wire bonded. A vertical device (without or without the growth substrate) may have a first terminal bonded to a carrier substrate, mounting pad, or PCB and a second terminal wire bonded to the carrier substrate, electrical element, or PCB. Examples of vertical and horizontal LED chip structures are discussed by way of example in U.S. Publication No. 2008/0258130 to Bergmann et al. and in U.S. Publication No. 2006/0186418 to Edmond et al., the disclosures of which are hereby incorporated by reference herein in their entireties.

Phosphors described herein can absorb at least a portion of light emitted by one or more LEDs and emit a different wavelength of light resulting in a combined emission of light from the one or more LEDs and the phosphor. In one embodiment, a white light combination of LED and phosphor light can be emitted. It is understood that LED devices and methods according to the present subject matter can also have multiple LEDs of different colors, one or more of which may be white emitting. Solid state light emitters can be used individually or in combinations, optionally together with one or more luminescent materials (e.g., phosphors, scintillators, lumiphoric inks) and/or filters, to generate light of desired perceived colors (including combinations of colors that may be perceived as white). Inclusion of luminescent (also called 'lumiphoric') materials in LED devices may be accomplished by any suitable method, not limited to adding such materials to encapsulants, adding such materials to lenses, or by direct coating onto LEDs. Other materials, such as dispersers and/or index matching materials may be included in such encapsulants and/or lenses.

Referring now to FIGS. 1-12, remote component devices, systems, and methods are illustrated. FIG. 1 is a perspective view of a remote component device, generally designated 10.

Figure 5:
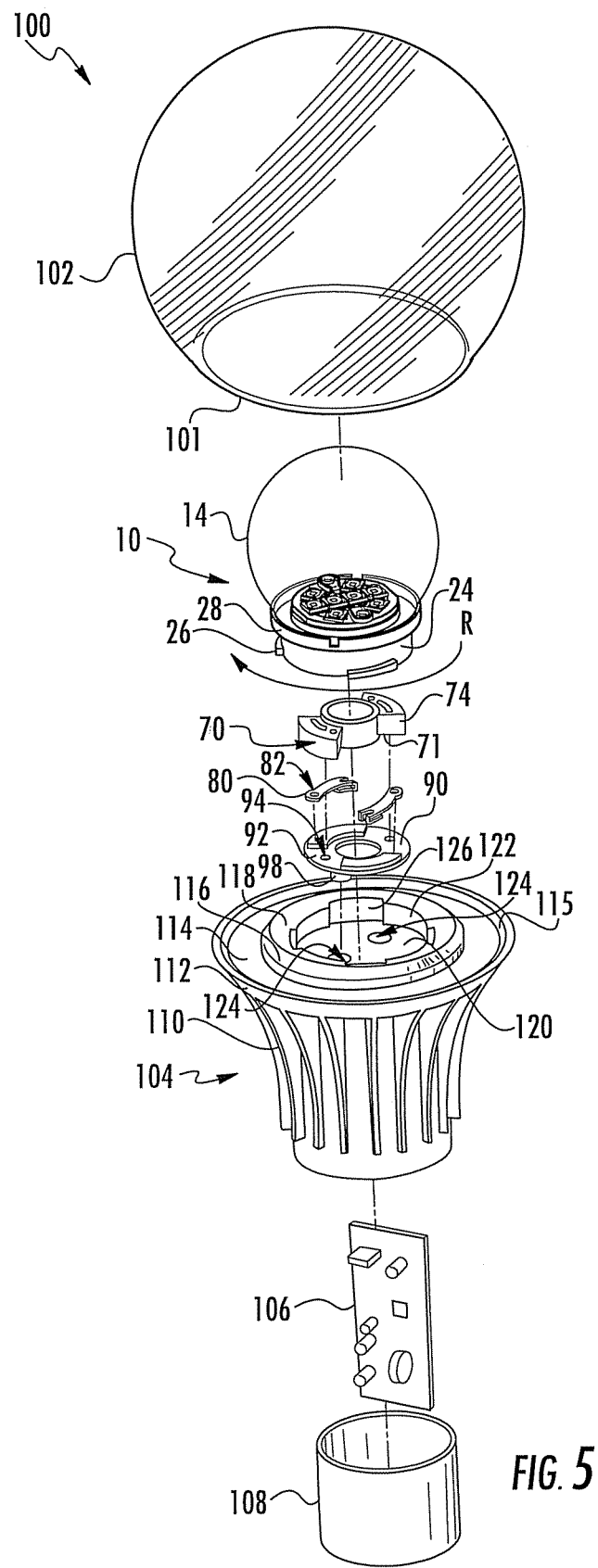
FIG. 5 is an exploded view of a remote component system according to an embodiment of the present subject matter.

Remote component 10 can comprise a lighting device which can be used alone or in combination with other devices and/or within lighting systems. In one aspect, remote component 10 can be fit or be adapted to easily fit into an A19 equivalent bulb. In other aspects, remote component 10 can be easily assembled into other LED products designed to accommodate the component. Remote component 10 can comprise a body 12 and a cover 14 disposed over the body 12. At least a portion of cover 14 can be configured and sized to fittingly engage a portion of body 12. In one aspect, body 12 can be adapted to engage an external component, for example, a remote component housing 104 as illustrated in FIG. 5. In one aspect, body 12 can lockably engage remote component housing by insertion of a lower protruding portion 98 into an opening 124 of housing 104 (See FIG. 5). Body 12 can be moved by twisting and/or rotating to become secured within housing 104 as further described below with respect to FIG. 5.

Remote component 10 can further comprise one or more light emitting devices disposed over body 12. The light emitting devices can be disposed above, on, and/or below and/or over any surface of body 12 either directly or indirectly. Remote component 10 can emit light having a predetermined wavelength upon illumination of the one or more light emitting devices. The light emitting devices can be directly or indirectly attached and/or thermally communicate to a portion of body 12. In one aspect, light emitting devices can be directly attached to body 12 using a thermal paste or any other suitable attachment materials and methods known in the art. In other aspects, light emitting devices can be indirectly attached to a portion of body 12 when one or more intervening substrates are disposed therebetween. Heat generated by the light emitting devices can dissipate into body 12. Heat can dissipate through substantially the center of body, in the area below the light emitting devices. If an intervening substrate is present, heat can dissipate through the substrate and into body 12. Light emitting devices can comprise one or more solid state emitters such as LEDs or LED packages 16. In one aspect, one or more LED packages 16 can be arranged over a portion of body 12. LED packages 16 can comprise any suitable package for housing one or more LEDs 18. Any suitable size, shape, or configuration of LED package 16 is hereby contemplated. Any suitable color or wavelength of LEDs 18 is hereby contemplated, not limited to blue, green red, and/or combinations thereof. Remote components 10 utilizing non-packaged LEDs 18 are also contemplated herein. That is, LEDs 18 could be directly or indirectly disposed over body 12 without a package, for example, in a chip on board configuration. Remote component can further comprise at least one contact 20 for supplying electrical signal, or current, to the one or more LEDs 18. One or more contacts 20 can be secured within remote component 10 by at least one rivet 22 which can extend internally within remote component 10 and electrically connect the one or more contacts 20 to a source of electrical signal, or current.

Figure 2:
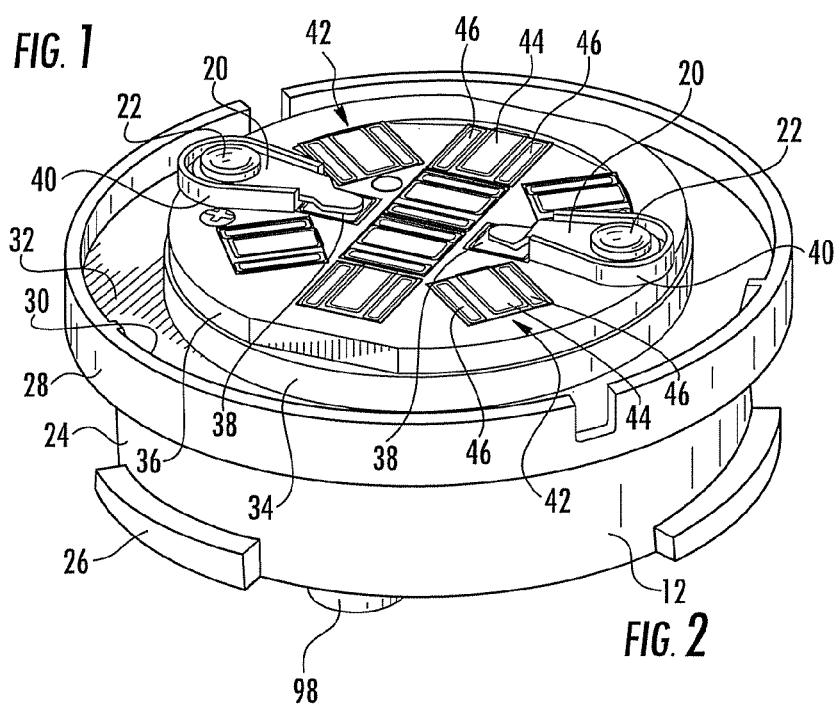
FIG. 2 is a perspective view showing a body portion of a remote component device according to an embodiment of the present subject matter.

FIG. 2 illustrates a perspective view of body 12 of remote component 10 without cover 14 or LED packages 16 disposed thereon. In one aspect, at least a portion of body 12 can comprise a heat transfer material through which heat from the one or more LEDs 18 can dissipate. Body 12 can comprise at least one outer wall 24. In one aspect, body 12 can comprise a substantially circular body comprising outer wall 24. In other aspects, body 12 can comprise any suitable shape having more than one wall, for example and not limited to, a square having four outer walls. The at least one outer wall 24 can comprise one or more protrusions 26 configured for locking engagement within an external component, for example, a remote component housing member. The one or more protrusions 26 can be integral with outer wall 14 or separate portions attached thereto. Protrusions 26 can be disposed along a lower or base portion of outer wall 24 and can be spaced apart about the perimeter of outer wall 24 at any suitable distance.

Still referring to FIG. 2, body 12 can further comprise an upper portion 28 that can have a greater diameter than outer wall 24. Upper portion 28 can substantially oppose the portion of outer wall 24 where protrusions 26 are located. In one aspect, outer wall 24 can extend in width between upper portion 28 and protrusions 26. Upper portion 28 can comprise an inner wall 30 disposed about upper surface 32. Inner wall 30 can be configured to engage at least a portion of cover 14. In one aspect, an adhesive can be used to secure cover 14 to upper portion 28 of remote component 10. A diameter of inner wall 30 can be substantially the same as a portion of cover 14 such that cover 14 can couple to inner wall 30. Body 12 can further comprise a platform 34 disposed on upper surface 32. Platform 34 can comprise a mounting surface over which LEDs 18 maybe directly or indirectly mounted. Platform 34 can elevate the LEDs within body 12 such that light can be emitted from a predetermined distance from body 12. In one aspect, remote component 10 can comprise a mounting substrate 36 disposed over platform 34. Any suitable attachment material and/or method can be used to attach mounting substrate 36 to platform 34 where a mounting substrate is used. In one aspect, a thermal paste can be used to secure mounting substrate 36 to platform 34. A thermal paste can thermally connect mounting substrate 36 to platform 34 such that heat can dissipate from the one or more LEDs 18 into body 12.

Still referring to FIG. 2, platform 34 and mounting substrate 36 can be adapted to receive one or more rivets 22 for passing electrical signal from an electrical power source to the mounting substrate 36 and into the LEDs. For example, rivet 22 can secure contacts 20 to an electrically conductive pad 38 of mounting substrate 36. Rivet 22 and contact 20 can be housed by an insulating member 40. Insulating member 40 can comprise any suitable electrically and/or thermally insulating material which can electrically and/or thermally isolate rivet 22 from other components of body 12. Insulating member 40 can prevent electrical shorting of remote component 10 by preventing electrical current from leaking into the body 12 of remote component. Insulating member 40 can surround rivet 22 and extend through the body 12 of remote component. In one aspect, mounting substrate 36 can comprise a metal core printed circuit board (MCPCB) such as those manufactured by the Bergquist Company of Chanhassen, Minn. Any suitable mounting substrate 36 can be used, however. MCPCB substrates typically comprise a core layer and a dielectric layer (not shown). The metal core layer can comprise a conductive metal layer, for example copper (Cu) or aluminum (Al). Dielectric layer can comprise an electrically insulating but thermally conductive material to assist with heat dissipation through mounting substrate 36. Mounting substrate 36 can comprise any suitable size, shape, and/or thickness. In one aspect, mounting substrate 36 can comprise a substrate having a diameter of at least approximately 22 millimeter (mm) and a thickness of at least approximately 0.47 mm in thickness. However, as noted, any size and/or thickness can be used. In one aspect, mounting substrate 36 can comprise a 1 mm Cu board having two 2.54 mm openings for receiving 1/16 inch rivets and leaving room for a 0.47 mm thick insulating member 40. The Cu used in mounting substrate 36 can weigh approximately 3 oz. Mounting substrate 36 can comprise approximately a 3 mil dielectric layer having a thermal conductivity equal to approximately 2.2 W/m-k or greater and approximately 6 kV breakdown voltage or greater.

Mounting substrate 36 can comprise one or more attachment surfaces, generally designated 42. Attachment surfaces 42 can comprise electrically and/or thermally conductive surfaces to which an LED or LED package can attach. In one aspect, attachment surfaces 42 can comprise an electrically and/or thermally conductive pattern substantially the same as a pattern on the mounting surface, or footprint, of the LED or LED package. That is, the LED or LED package can mount over the mounting surface and electrical and thermal elements of the LED package can substantially align to electrical and thermal elements of the attachment surface. In one aspect, attachment surfaces 42 can comprise thermally conductive surface 44 and one or more electrically conductive surface or surfaces such as surfaces 46. Electrically conductive surfaces 46 can comprise an anode and cathode for passing electrical current into LED or LED package.

A solder mask layer can be deposited over mounting substrate 36 in areas outside attachment surfaces 42 and conductive pads 38. Solder mask 48 can prevent the one or more LEDs or LED packages from electrically shorting and/or electrical failure from defects if attachment material, for example, solder, squeezes out during attachment of the LEDs or LED packages to attachment surfaces 42. In one aspect, solder mask 48 can comprise a material forming white surface for improving brightness of light emitted from LEDs or LED packages. The white surface can reflect more light, thereby increasing the brightness of remote component 10. In one aspect, a white PSR-4000 WT03 solder mask can be used, such as those manufactured by Taiyo Holdings Co., Ltd. of Tokyo, Japan, or subsidiaries thereof. The solder mask can maintain its whiteness through heating and/or reflow processes. Conductive pads 38 can electrically communicate to attachment surfaces 42 using conductive traces (not shown) disposed beneath solder mask 48. Conductive traces can be internal to mounting substrate 36 and can electrically connect attachment surfaces, and therefore the LEDs, in series, in parallel, and/or combinations thereof. Electrical current can pass from rivet 22 to contact 20 and into conductive pads 38. Conductive pads 38 electrically communicate to each of attachment surfaces 42 and supply current to the LEDs. In one aspect, one or more LED packages 16 can be disposed over mounting substrate 36. In one aspect, eight LED packages 16 can be disposed over mounting substrate 36. As mentioned above, LED packages 16 can comprise any suitable package and any suitable LED chip can be disposed within the package. In one aspect, LED package 16 can comprise a square footprint of at least approximately 2 mm or greater length and width. That is, footprint of LED package 16 can comprise an area of approximately 4 mm$^2$ or greater in some aspects.

Figure 3:
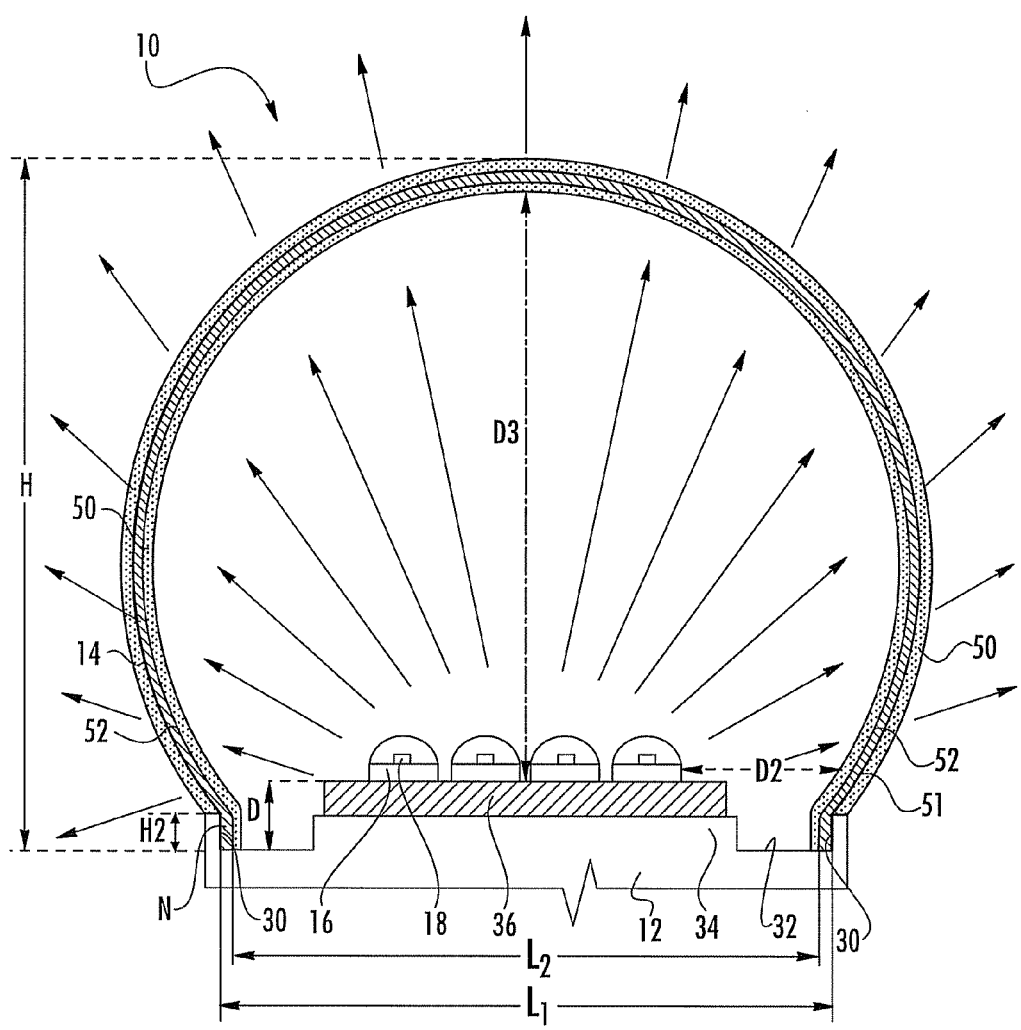
FIG. 3 is a cross-sectional view of a remote component device of according to an embodiment of the present subject matter.

FIG. 3 illustrates a cross-sectional view of remote component 10. In this view, LED packages 16 are shown disposed over platform 34 of body 12.

LEDs 18 are illustrated in LED packages 16; however, unpackaged LEDs 18 could also be used. LEDs 18 and/or LED packages 16 can be mounted directly over platform 34 of body 12, or as illustrated, LED packages 16 can be mounted over mounting substrate 36. LEDs 18 can be attached within LED packages 16 using any suitable die attach materials and/or methods. For example, in one aspect LEDs 18 can be attached within packages 16 using metal-to-metal bonding techniques comprising flux-assisted eutectic die attach, metal-assisted non-eutectic die attach, or thermal compression die. Metal-to-metal die attach comprises a robust die attach resulting in a more reliable die attach during operation of remote component 10. This can result in fewer LEDs becoming detached during operation. In the alternative, LEDs 18 can be attached using silicone, silver (Ag) epoxy, solder. Any suitable die attach can be used.

As FIG. 3 illustrates, cover 14 comprises an outer surface 51 and an inner surface 52. Outer and inner surfaces 51 and 52 can be coated with one or more layers of optical materials to thereby emit light external from the cover 14 having desired optical properties. For illustration purposes FIG. 3 illustrates both outer and inner surfaces 51 and 52 coated with optical material, however, in some aspects only one of the outer or inner surface 51 and 52 is coated. When electrical current is passed through LED packages 16, LEDs 18 can emit light towards an inner surface 52 of cover 14. Optical materials coated on either the inner and/or outer surfaces 51 and 52 can interact with light emitted from the one or more LEDs 18 to emit light having a desired wavelength and/or brightness. Optical materials can comprise luminescent materials having an amount of phosphor material 50. Any suitable phosphor can be used with remote component 10. Phosphor material 50 can generate light of desired perceived colors when the light emitted from the LEDs 18 interacts with the phosphor. Other materials, such as dispersers and/or index matching materials may be included in the phosphor material 50. Phosphor material 50 can be applied and/or coated to cover 14 using any suitable method. In one aspect, a predetermined weight of phosphor material 50 can be mixed with an adhesive material and loaded in a syringe. The mixture can then be coated to outer surface 51 and/or inner surface 52 of cover 14 and can optionally be cured. In one aspect, the mixture is spray coated, however, any suitable coating method can be used. For example, phosphor material 50 can coat the inside and/or outside of the cover 14 by spraying, brushing, molding, encapsulating, adhering, dipping, and/or any combinations thereof. Any suitable coating method can be used. The cover can be cleaned, measured, and inspected prior to assembly over body 12 such that defects in the coating can be detected and cured prior to assembly. Adhesive material can comprise any suitable material, not limited to silicone or encapsulants.

Notably, light emitted from remote component 10, that is, light emitted external from cover 14 can be emitted both above and/or below the LEDs 18. Conventional lighting products utilizing LEDs emit light mainly from the top of a lighting device only. This can be a problem for lighting devices used, for example, in table lamps. Ideal table lamps emit light below the light emitting devices to accommodate activities such as reading. The light needs to be emitted below the light emitting devices to illuminate, for example, the pages of a book which most likely will be located below the bulb of table lamp. Remote components herein can be used in lighting products and devices, including products adapted to replace conventional filament and/or compact fluorescent light (CFL) bulbs on the market. Remote components 10 described herein are configured to emit multi-directional or omnidirectional light and can be used to replace conventional bulbs. That is, remote components 10 described herein can emit light in multiple directions from cover 14, including directions below LEDs 18, rather than being limited to emitting light mainly from the top of the device.

Still referring to FIG. 3, nomenclature for remote component 10 is at least partially derived from the spacing of the LEDs 18 and phosphor material 50. That is, phosphor material 50 is remotely located with respect to the LEDs 18 and LED packages 16. Phosphor material 50 therefore can be excluded from being disposed, for example, directly on and over LEDs 16 or within LED packages 18. Phosphor material 50 can be located any suitable distance from the LEDs, for example, at least approximately 1 mm or greater. As FIG. 3 illustrates, LEDs 18 can be mounted a first distance D over upper surface 32 of body 12. This can, in part, allow light to be reflected and emitted below the LEDs 18. First distance D can comprise any suitable distance. Phosphor can be remotely located from the one or more LEDs 18 and/or LED packages 16 a minimum distance of D2 from phosphor material 50. Minimum distance D2 can comprise any suitable distance, for example, at least approximately 1 mm or greater. In one aspect, minimum distance D2 can be equal to approximately 20 mm or greater, depending on the desired size of remote component. Any suitable minimum distance D2 is contemplated herein. LEDs 18 and/or LED packages 16 can also be located a maximum distance D3 from phosphor material 50. In one aspect, LEDs and/or LED packages 16 can be disposed substantially beneath or below cover 14. FIG. 3 illustrates LEDs 18 disposed substantially beneath a substantially circular, domed, and/or rounded cover 14. However, cover 14 can comprise any suitable size and/or shape. In addition, LEDs 18 and/or LED packages 16 can be disposed at any position below cover 14. As illustrated, LEDs 18 and LED packages 16 can be substantially disposed beneath a center of cover 14, the center corresponding to maximum distance D3. However, LEDs 18 and/or LED packages 16 can be positioned at suitable location below cover 14, for example, to the left or right of center. Size, number, and positioning of LEDs 18 and LED packages 16 can affect light emission. Any suitable size and number of LEDs 18 and/or LED packages 16 can be used, and the LEDs 18 and/or LED packages 16 can be disposed at any suitable location substantially below cover 14.

Still referring to FIG. 3, cover 14 can further comprise a neck portion N for engaging inner wall 30 of body 12. Neck N is adapted to engage inner wall 30 using an adhesive or any suitable material. Neck N could also be adapted to frictionally or threadingly engage inner wall 30 of body 12. Any suitable method can be used to secure neck N of cover 14 to inner wall 30 of body. In one aspect, neck N can be disposed below the plane on which the LEDs 18 are mounted, and can comprise any suitable size to accommodate sufficient structural strength when connecting and/or engaging to body 12. In one aspect, neck can comprise an outer diameter L1 of approximately 40 mm or less. In one aspect, neck N can comprise an outer diameter L1 of approximately 30 mm or less, for example, approximately 25.7 mm or less. However, neck N can comprise any suitable outer diameter L1. FIG. 3 further illustrates neck N comprising an inner diameter, L2. Inner diameter L2 can correspond to the thickness of cover 14, for example, where the cover comprises a thickness of approximately 1 mm or less, neck N can comprise an inner diameter of approximately 39 mm or more. Cover 14 can comprise any suitable thickness and any suitable inner diameter L2. In one aspects, neck can N can comprise an inner diameter L2 of approximately 30 mm or less, for example, approximately 24.5 mm or less. However, neck N can comprise any suitable inner diameter L2.

Cover 14 and neck N can also comprise any suitable height. In one aspect, cover can comprise a height H measured from the base of neck N to the furthest point of the outer surface. For example, for spherical shapes, the height can be measured from the topmost curvature of the cover 14. In one aspect, cover 14 can comprise a height H of approximately 50 mm or less. In one aspect, cover 14 can comprise a height approximately 40 mm or less. In one aspect, cover 14 can comprise a height of approximately 35 mm or less, for example, approximately 33.4 mm or less. However, any suitable height H of cover is hereby contemplated. Similarly, neck N can comprise a height H2. In one aspect, neck N height H2 can comprise approximately 5 mm or less. In one aspect, height H2 can comprise approximately 3 mm or less. In one aspect, height H2 comprises approximately 2.8 mm. Neck N can comprise any suitable size, shape, height, and/or diameter. Cover 14 can also comprise an inner diameter in which light can be emitted. In one aspect, inner diameter of cover can comprise approximately 40 mm or less. In one aspect, cover 14 can comprise an inner diameter of approximately 35 mm or less, for example, approximately 34.8 mm. Cover can comprise an outer diameter from which light can be emitted. In one aspect, cover can comprise an outer diameter of approximately 45 mm or less. In one aspect, an outer diameter of cover can comprise approximately 36 mm or less. Any suitable size, shape, height, and/or diameter of cover 14 is hereby contemplated.

Remote components 10 described herein can target various colors and wavelengths of light. Light emitted from remote component 10 can comprise a combination of the light from the LEDs 18 and/or LED packages 16 in combination with the light emitted from phosphor material 50. In one aspect, remote component 10 devices disclosed herein can consume approximately 18 watts (W) of power or less as opposed to conventional bulbs which require at least approximately 40-120 W. For example, remote components 10 described herein can use approximately 12.5 W or less of power. In one aspect, remote components 10 described herein can use approximately 10 W or less of power. Thus, remote component devices and systems described herein can use several times less energy than conventional lighting products and light bulbs, thereby saving energy and reducing energy-related costs. In one aspect, remote components 10 described herein target cool white (CW), outdoor white, neutral white, and warm white (WW) colors. Remote component 10 devices as described herein can, for example and without limitation, offer light output of approximately 800 lumens (lm) or more at 500 mA (12.5 W) at CW, outdoor white, neutral white, and WW color points. In some aspects, remote component 10 devices as described herein can, for example and without limitation, offer light output of approximately 800 lumens (lm) or more at 10 W or less at CW, outdoor white, neutral white, and WW color points. Remote component 10 devices disclosed herein can be used alone and/or in lighting fixtures offering a minimum CRI for CW color points of 75 CRI which corresponds to a range of 5,000 K to 10,000 K CCT. Remote component 10 devices disclosed herein can also offer, for example, a minimum CRI for WW color points of 80 CRI which corresponds to a range of 2,600K to 3,700K CCT. Remote component 10 devices disclosed herein can also offer, for example, a minimum CRI for color points of 90 CRI which corresponds to a range of 2,600K to 3,200K CCT. Remote component 10 devices can be used for both standard and high voltage configurations. In one aspect, brightness can be improved by using optimized methods and/or procedures described herein. For example, an approximately 6% or more improvement in brightness can be attained using metal-to-metal die attach as previously described herein. An approximately 4% or more improvement in brightness for example can be attained using a white solder mask around the one or more LEDs or LED packages. Approximately 12% brightness can be attained for example by using remote component 10 without an outer bulb 102 (FIG. 5). And finally, an approximately 5% or more improvement in brightness can be attained for example when the remote component 10 is used without a housing 104 (FIG. 5).

In one aspect, typical performance at 12.5 W can comprise at least approximately 1040 lm and at least approximately 83 lm/W. Typical performance at 12.5 W can also comprise at least as minimum of 80 CRI and 3000 CCT within a 30F bin. Uniformity of light emitted from remote component 10 can be controlled by controlling the uniformity of the phosphor material 50. In one aspect, uniformity can be controlled by adjusting a spray pattern of the phosphor material 50 for instances where phosphor material is spray coated to the outer surface 51 or inner surface 52 of cover 14.

Figure 4:
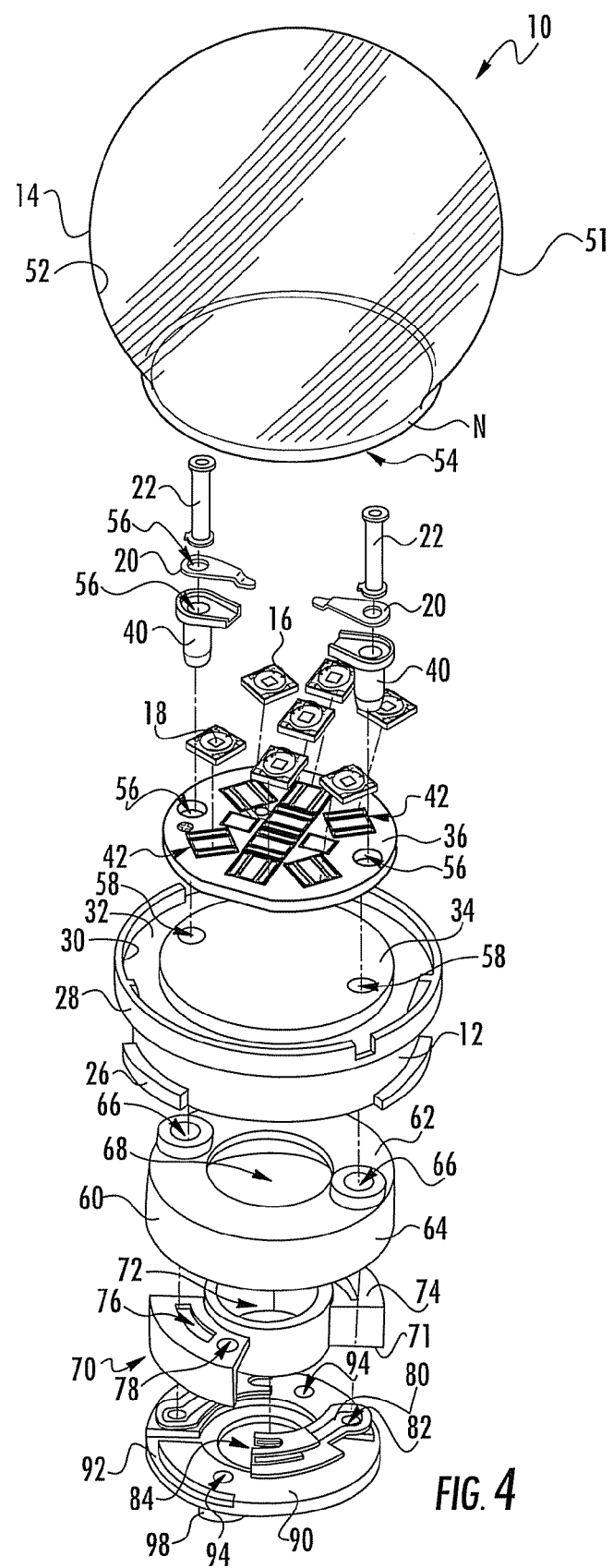
FIG. 4 is an exploded view of a remote component device according to an embodiment of the present subject matter.

FIG. 4 is an expanded view of remote component 10, and illustrates various devices and/or components thereof. Remote component 10 can comprise a housing for several members within body, for example, internal outer wall 24. Remote component 10 can comprise cover 14 with an opening 54 sized to fittingly engage inner wall 30 of body 12. In one aspect, cover 14 can comprise a substantially spherical and/or hemispherical shape. However, cover 14 can comprise any suitable shape. In one aspect, the spherical shape of the cover 14 can maximize light output from the one or more LEDs 18. For example, the spherical shape can be configured such that the plane of light emission from the one or more LEDs 18 can be directed towards the spherical and/or hemispherical surfaces as opposed to the neck N and/or opening 54.

FIG. 4 illustrates rivets 22 having a substantially elongated and rod-shaped body disposed between terminating upper and lower ends. One or more rivets 22 can electrically couple components of body 12 and can serve as electrical conduits, or conductive vias, through which electrical current can flow. Rivets 22 can electrically couple one or more contacts 20 to one or more respective electrical connectors 80, the electrical connectors receiving electrical signal or current from a power source such as a circuit 106 (FIG. 5). Rivet 22 can comprise any suitable electrically conductive material. Rivet 22 can be formed integral with body 12 or as a separate member inserted into body. Rivet 22 can be manufactured by pressing, extruding, machining, layering and/or otherwise depositing material into body, and/or combinations thereof. In the alternative, rivet 22 can be formed using any suitable method. Rivet 22 can be at least partially encased by and extend a length of insulating member 40. Insulating member 40 can prevent electrical current from transferring to other parts of body 12 and reduces the potential of electrical defects and/or electrical shorting of remote component 10. Terminating upper and lower ends of rivet 22 can engage and/or otherwise attach to upper and lower conducting members thereby channeling electrical current through body 12. For example a first upper end of rivet 22 can engage contact 20 and a second lower end of rivet 22 can engage a lower electrical connector 80. In one aspect, lower electrical connector 80 can comprise an insulation displacement connector (IDC) type of electrical contact as explained further below. IDC connectors are advantageous in one aspect, as they eliminate the need for manufacturing components with tedious soldered electrical connections which can sometimes fail if inadequately soldered or if heat from the soldering process damages other members of remote component.

One or more rivets 22 can also mechanically couple several members within body 12. For example, rivets 22 can extend through and mechanically couple mounting substrate 36, platform 34, and body 12 with an insulating portion 60 of the body and electrical connector 80. Notably, rivets 22 in one aspect do not extend through and/or mechanically couple to an electrical connector housing 70 or a locking member 90. In one aspect, body 12 comprises a rotatable member. Upon rotation of body 12, each of the other components mechanically coupled thereto can also simultaneously rotate such that remote component 10 can simultaneously electrically, thermally, and mechanically couple to another component, for example, a component housing 104 (FIG. 5). Connector housing 70 and locking member 90 can remain stationary upon rotation such that electrical connector 80 can rotate with body 12 about locking member 90 and become disposed within connector housing 70. Electrical connector 80 can then pierce or otherwise displace insulation from an electrically conductive wire held within openings 78 of connector housing 70. Electrical connector 80 can therefore electrically communicate with the conductive wire, as illustrated best in FIG. 9. Electrical current can be communicated and/or transferred from conductive wire to electrical connector 80. Electrical connector 80 can then electrically communicate electrical current to rivet 22 which channels the current through body 12 to contact 20. Contact 20 transfers the electrical current to conductive pads 38 which communicates electrical current to the one or more LEDs 18 and/or LED packages 16.

As FIG. 4 further illustrates, one or more LEDs 18 or LED packages 16 can be disposed over mounting substrate 36. Any suitable attachment material and/or method can be used to attach LEDs 18 and/or LED packages 16 to mounting substrate 36. In one aspect, an electrically and/or thermally conductive solder material, for example, a solder paste can be used to attach LEDs 18 and/or LED packages 16 to mounting substrate 36. In one aspect, a metallic solder paste, such as a lead (Pb) or Pb-free solder paste can be disposed between LED package 16 and attachment surfaces 42 of mounting substrate 36. Likewise, a Pb or Pb-free solder paste can be disposed over conductive pads 38. Rivets 22 can be disposed between openings 56 in each of the contacts 20, insulating members 40, and mounting substrate 36. Contacts 20 can be positioned over conductive pads 38. LED packages 16 can be picked and placed with a machine. Mounting substrate 36, LED packages 16, rivets, contacts, and insulating member 40 can then be heated, for example, by reflowing in a reflow oven to a suitable temperature for securing LED packages 16 to attachment surfaces 42 of mounting substrate 36 and for securing contacts to conductive pads 38.

Upon reflow, mounting substrate 36 can be secured over platform 34 of body 12 using any suitable material, for example, a thermally conductive paste. Mounting substrate 36 can also be mechanically coupled to platform 34 by the one or more rivets 22. Rivets 22 can be positioned over one or more holes 58 of body 12 and subsequently lowered or otherwise deposited therein. Insulating members 40 can frictionally engage holes 58 of body 12 thereby fixedly securing rivets 22 within body 12. Rivets 22 can further extend into insulating portion 60 disposed substantially below body 12. Insulating portion 60 can comprise one or more holes 66 configured to receive rivets 22. At least a portion of insulating member 40 can extend into and frictionally engage holes 66 of insulating portion 60 thereby fixedly securing body 12 to insulating portion 60. Insulating portion 60 can further comprise an upper surface 62 and outer wall 64 which can be substantially shaped the same as inner surfaces of body 12 (not shown). Upper surface 62 and outer wall 64 of insulating portion 60 can matingly engage body 12 when one or more rivets 22 are inserted through each of body 12 and insulating portion 60. This is illustrated best in FIGS. 8A and 8B. Insulating portion 60 can comprise a hollowed center 68 which can centrally surround a portion of the body comprising a heatsink, or heat transfer material.

FIG. 4 further illustrates connector housing 70 disposed over locking member 90. At least one electrical connector 80 can be disposed therebetween, and also positioned over locking member 90. Connector housing 70 and locking member 90 can in one aspect not be mechanically coupled by one or more rivets 22 to body 12 or various components thereof. Rather, connector housing 70 can comprise one or more housing portions 74 with bottom surfaces 71 fixedly held within notches, or stepped portions 92 of locking member. Upper surfaces of housing portions 74 can comprise one or more apertures 76 which may align with a surface of insulating portion 60 (not shown) for further alignment and positioning of connector housing 70 above locking member 90 and below insulating portion 60. Upon rotation of body 12, connector housing 70 can remain engaged within stepped portions of 92 of locking member 90, and rotation can induce one or more electrical connectors 80 to move into the one or more housing portions 74 of connector housing 70. As illustrated, rivets 22 can extend through each of holes 58 of body 12 and holes 66 of insulating portion 60 and can bypass connector housing 70. Rivets 22 can extend through openings 82 of the at least one electrical connector 80 and can mechanically couple electrical connector 80 to insulating portion 60. Connector housing 70 can comprise a hollowed center 72 substantially aligned with hollowed center 68 of insulating portion 60. Each of the hollowed centers can be disposed about a thick, central portion of body 12 configured to dissipate heat from the one or more LEDs 18 and/or LED packages 16.

Locking member 90 can further comprise a lower protruding portion 98 which can engage a portion of an external housing, for example, housing 104 in FIG. 5. Locking member 90 can engage housing 104, and by rotation, or twisting body 12, protruding portions 26 of body 12 can lockably engage with housing 104 thereby securing remote component 10 within housing 104. An electrically conductive wire (not shown) can be fed through openings 124 of housing 104 (FIG. 5) and through protruding portion 98 of locking member and then through openings 94 of locking member 90. Wire can further be fed into openings 78 of connector housing 70. An insulated covering can be disposed over the conductive wire, and the insulated covering can be pierced when electrical connector 80 is moved into connector housing 74. Electrical connector 80 can comprise one or more centrally aligned apertures 84 for piercing the insulated portion of a conductive wire. Together, electrical connector 80 and connector housing 70 can comprise an IDC which is notably a solder-free electrically conductive connector to electrically couple the conductive wire and rivet 22. For example, the insulated conductive wire can be fed and held between openings 94 of locking member 90 and connector housing 70, respectively. Upon rotation, the IDC can pierce or otherwise displace the insulated covering of the conductive wire and allow current to flow from the wire, into the electrical connector 80 and into rivet 22. Rivet 22 can then transfer the electrical current to contact 30 and conductive pad 38. Conductive pads 38 can electrically connect to each of the one or more LEDs 18 and/or LED packages 16 thereby illuminating the LEDs 18 and/or LED packages 16. The IDC can facilitate an electrical connection within remote component 10 that does not require soldering the conductive wire to various components within remote component 10. The solder free IDC connection can be more robust and less tedious than soldering connections within remote component 10. In addition, the IDC can significantly improve the ease of use and manufacturability of lighting fixtures and systems utilizing remote components 10, as the component can be placed and simply twist-locked within a remote component housing, such as housing 104 (FIG. 5) without requiring tedious, messy, and cumbersome soldering processes.

FIG. 5 illustrates an exploded view of a remote component system, generally designated 100. Remote component system 100 can comprise a bulb 102 substantially surrounding remote component 10. Remote component 10 can be lockably secured within a remote component housing 104. A circuit 106 can be disposed within housing 104 above a base 108. Circuit 106 can receive power when a switch, for example, a lamp switch is turned on. Current can flow from circuit 106 through one or more wires (not shown) inserted into one or more openings 124 of housing 104. In one aspect, housing 104 can comprise two openings 124 at any suitable location for connecting two wires to circuit 106. One wire can electrically connect to an anode and the other wire can electrically connect to a cathode of circuit 106 for supplying electrical current to the one or more LEDs 18. The openings 124 in housing can receive two wires fed up from circuit 106 and the wires and/or holes can comprise any suitable diameter. In one aspect, wires can comprise two 22 AWG wires. Wires can be fed into locking member 90 and connector housing 70. In one aspect, locking member 90 can be polarized (i.e., fitting only one way within housing 104) such that the electrical polarity of the wires should be considered when introducing the wires into each of housing 104, locking member 90, and connector housing 70. Locking member 90 can be optional to remote component devices, systems, and methods disclosed herein. That is, customers and/or consumers could use any suitable locking member 90 for securing remote component within housing 104. Upon rotation of remote component 10 in the direction indicated by the arrow R, remote component 10 can be simultaneously with one motion thermally, electrically, and mechanically coupled to housing 104.

As FIG. 5 illustrates, housing 104 can comprise an outer surface having one or more outer fins 110 disposed thereon. Remote component 10 can simultaneously mechanically, electrically, and thermally couple to housing 104 by any suitable configuration or structure dictating a prescribed motion, and this coupling is shown for illustration purposes as coupling from rotational movement but is by no means limited to such movement or structure dictating such movement. Fins 110 can increase the surface area from which heat can dissipate when remote component 10 thermally couples to housing 104. Housing 104 can further comprise an upper portion 112 for mechanically connecting to bulb 102. Upper portion 112 can comprise an upper surface 114 at least partially surrounded by an inner wall 115. A lower portion 101 of bulb 102 can engage with inner wall 115 of housing. In one aspect, an adhesive material can be applied to inner wall 115 and lower portion 101 of bulb 102 can be secured thereto after mechanically coupling remote component 10 to housing 104. Housing 104 can further comprise an elevated portion 116 extending from upper surface 114. In one aspect, elevated portion is substantially disposed at a center of upper surface 114 of housing 104. Elevated portion 116 can comprise an elevated surface 118 substantially parallel upper surface 114. Elevated surface 118 can be disposed on a plane above upper surface 114. Upper surface 28 of remote component 10 can substantially engage elevated surface 118 when remote component 10 is positioned within housing 104. For example, elevated portion 116 of housing 104 can comprise a centrally disposed hollow center having a floor 120 at least partially surrounded by an inner wall 122 of elevated portion 116. One or more openings 124 can be disposed in floor 120. Openings 124 can be adapted to receive a conductive wire from circuit 106 and adapted to feed the conductive wire into remote component 10 through openings 94 of locking member 90. Openings 124 can also be adapted to engage lower protruding portion 98 of locking member 90. Elevated portion 116 of housing 104 can be adapted to receive at least a portion of remote component 10 therein. At least a portion of remote component 10 can be disposed over floor 120 and at least a portion of protruding portions 26 of remote component can frictionally engage inner wall 122 of elevated portion 116.

As FIG. 5 illustrates, inner wall 122 of housing 104 can comprise one or more expanded portions 126. Expanded portions 126 can be spaced apart inner wall 122. In one aspect, expanded portions 126 of inner wall 122 correspond to a shape and number of protruding portions 26 of remote component 10. Expanded portions 126 can be wider than a thickness of protruding portions 26 such that protruding portions 26 can easily align and fit therein. Inner wall 122 can be configured for frictionally engaging the exterior of remote component 10 when remote component is rotated such as for example as indicated by arrow R. In addition, remote component 10 can frictionally engage floor 120 of housing 104. That is, remote component 10 can be disposed over and/or attached to locking member 90. Each of remote component 10 and locking member 90 can be inserted into the hollowed center of elevated portion 116 of housing 104. Lower protruding portion 98 of locking member 90 can be positioned at least partially within opening 124 of floor. Protruding portions 26 of remote component 10 can be positioned in expanded portions 126 and rotated to grip and/or frictionally engage inner wall 122. Upon rotation in direction R, body 12 with protruding portions 26 can rotate over locking member 90 to frictionally engage inner wall 122 of housing 104. In one aspect, a spanner tool can be used to twist remote component 10 clockwise by approximately ¼ turn within housing 104. Thus, rotation of remote component 10 can mechanically couple remote component 10 to housing 104. This design can be advantageous to consumers and/or manufacturers of remote component devices, systems, and methods described herein, as such devices and systems can be easy to use. Simply insert remote component, twist, and the component and/or system is ready to use. A thermal paste or adhesive can optionally be disposed between locking member 90 and floor 120 of housing 104. In one aspect, a thermal pad can optionally be disposed between locking member 90 and floor 120 of housing 104. Once remote component 10 is rotated to lock it within housing 104, the remote component and housing 104 are also thermally coupled. Heat can dissipate from one or more LEDs 18 to body 12 and housing 104. Notably, customers and/or consumers can design their own locking member 90 for twist-locking remote component 10 to housing 104.

Figure 6:
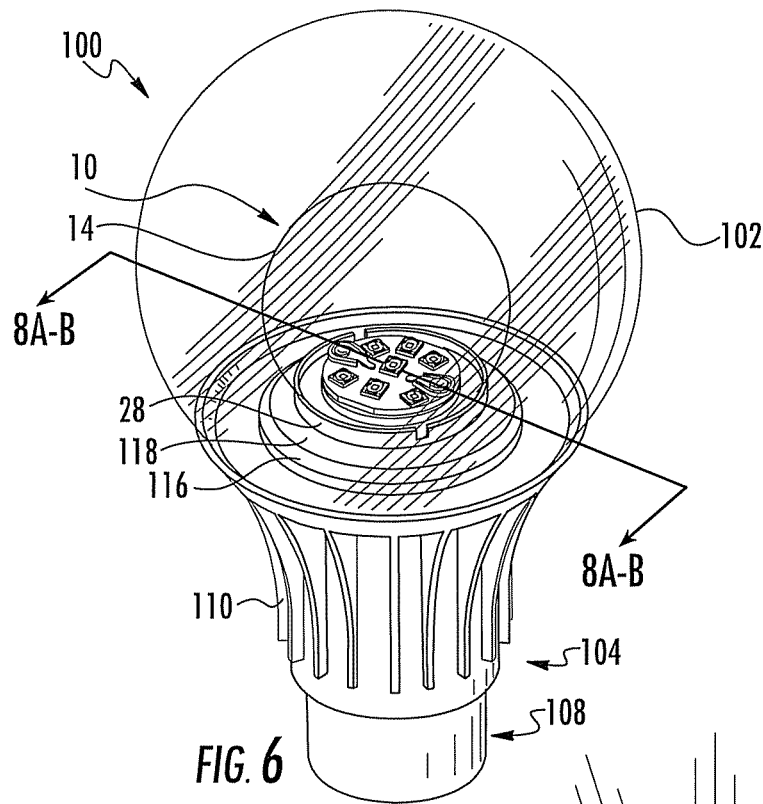
FIG. 6 is a perspective view of a remote component system according to an embodiment of the present subject matter.
Figure 7:
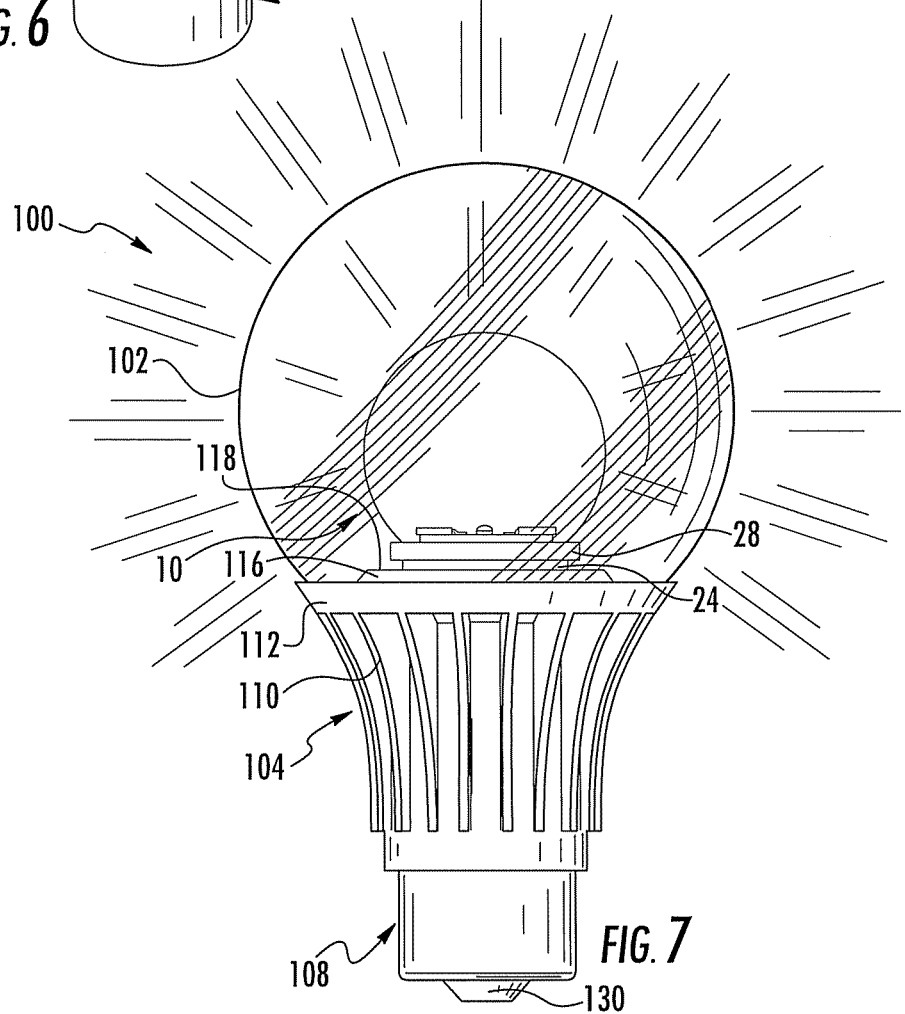
FIG. 7 is a side view of a remote component system according to an embodiment of the present subject matter.

FIGS. 6 and 7 illustrate side and perspective side views of an assembled remote component system, generally designated 100. That is, remote component 10 has been inserted and rotated to lock it within housing 104. Remote component 10 can mechanically, electrically, and thermally communicate with housing 104 upon rotation. Bulb 102 can then be positioned over housing 104 and secured to inner wall 115 thereof. Bulb 102 can be transparent, semitransparent, opaque, and/or any combination thereof. For illustration purposes, bulb 102 is illustrated as transparent such that remote component 10 can be visibly seen therein. FIG. 7 illustrates remote component 10 centrally disposed with respect to bulb 102. However, any configuration is contemplated. In some embodiments, remote component 10 can be to the left or right of center. In other embodiments, bulb 102 can comprise any suitable shape than the pear shape (A19 size/shape) as illustrated. Any size and/or shape of bulb 102 and remote component system 100 are hereby contemplated. In one aspect, remote component system 102 can comprise an A19 equivalent bulb. That is, remote component system can be adapted to replace standard filament and CFL size A19 light bulbs. As FIG. 7 illustrates, light can be emitted from remote component and illuminate the inside of bulb 102 as the lines indicate. The light can then be emitted through bulb 102 as the lines external of bulb 102 indicate. In some aspects it may be desirable to use remote component 10 in a housing 104 without a bulb 102. In other aspects, a bulb 102 is advantageous. Notably, the remote component system can emit omnidirectional light both above and/or below remote component. Base 108 of lamp can comprise an electrical connector 130 adapted to engage and fit within standard sockets for lighting fixtures. Electrical current can be communicated into remote component system 100 when activated by turning a lamp switch "on." Electrical current can flow into circuit 106 (FIG. 5) which can comprise one or more wires (FIG. 9) for feeding up through housing 104 and held between openings 78 of connector housing 70 and openings 94 of locking member 90. Insulation about one or more wires can then be displaced using electrical connector 80, for example, an IDC which can electrically communicate current to rivet 22 and cause the electrical current to illuminate the one or more LEDs 18. Electrical connector 130 can be adapted to fit within sockets of table lamps, floor lamps, and/or any other suitable lighting product, fixture, or system. In optional designs, base 108 can be threaded such that it can threadingly engage with a lamp socket and be secured thereto. In one aspect, base 108, circuit 106, and housing 104 can be pre-designed and/or pre-assembled using any suitable method. The pre-designed and/or pre-assembled housing 104 can be configured for receiving remote components 10 described herein.

Figure 8A:
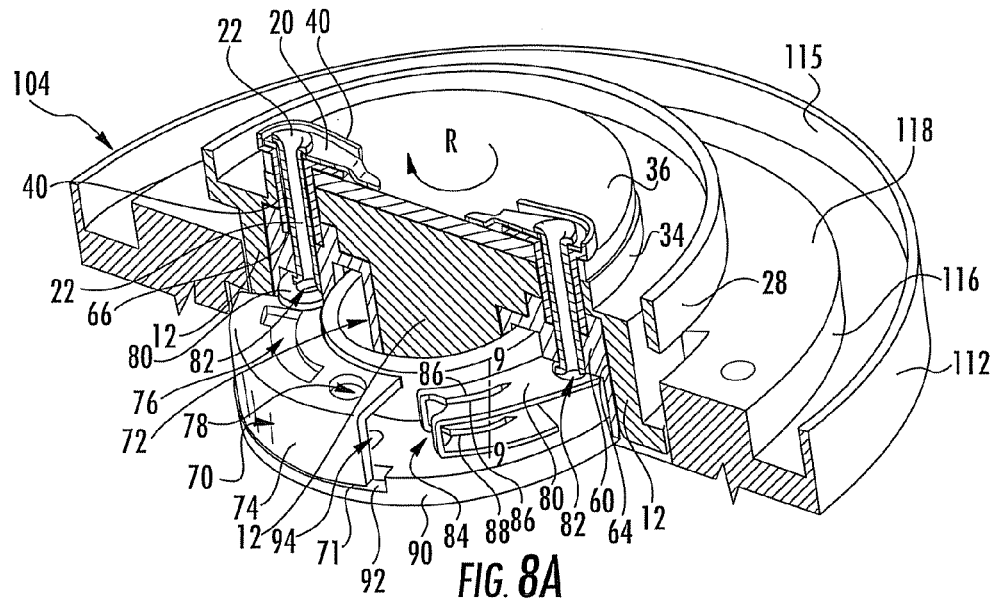
FIGS. 8A and 8B are electrical connector devices of remote component devices and systems according to an embodiment of the present subject matter.
Figure 8B:
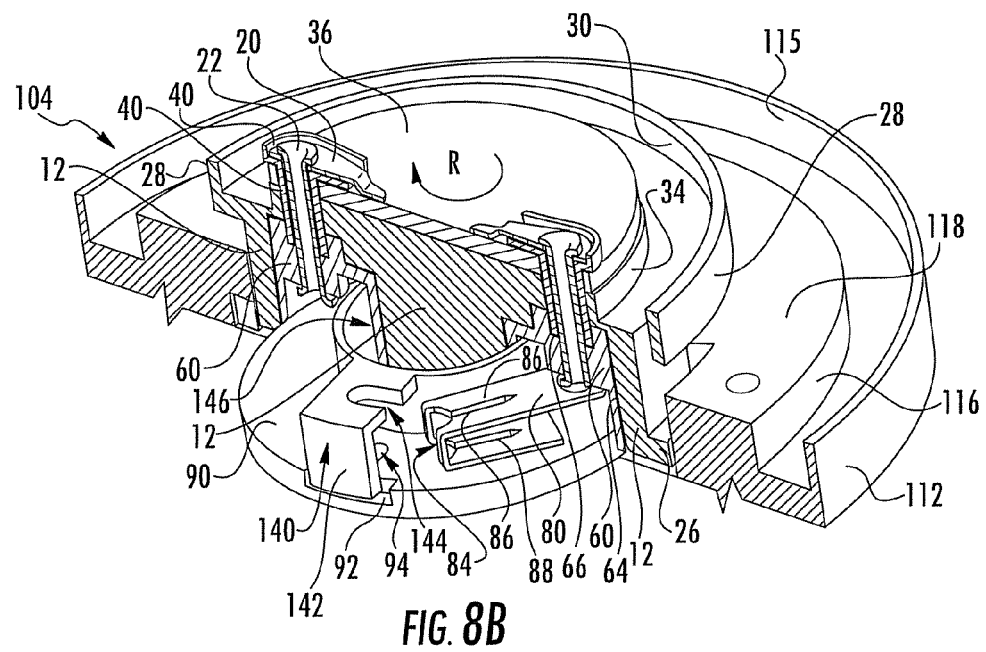

FIGS. 8A and 8B illustrate an unexploded portion of a cross-sectional view of housing 104 with remote component 10 disposed therein. FIG. 8A illustrates a first embodiment of an IDC connector as described earlier. FIG. 8B illustrates another embodiment of an IDC connector. For illustration purposes, only two embodiments are shown, however, any embodiment of a connector adapted for piercing and/or otherwise displacing insulation from a conductive wire is hereby contemplated. FIGS. 8A and 8B illustrate body 12 of remote component disposed within housing 104. One or more rivets 22 can electrically communicate with one or more contacts 20 and one or more electrical connectors 80. At least a portion of rivet 22 can be positioned through opening 82 of electrical connectors 80. Rivet 22 can mechanically couple body 12 to each of insulating portion 60 and electrical connector 80. An insulating member 40 can be at least partially disposed about a portion of rivet 22. Insulating member 40 and rivet 22 can at least partially extend vertically within body 12. Upon rotation in the direction indicated by the arrow R, each of body 12, insulating member 60, and electrical connector 80 can simultaneously rotate about locking member 90 and electrical connector housing. An insulated wire (FIG. 9) can be fed up through housing 104 and can supply electrical current for illuminating remote component 10. Electrical connector 80 can be electrically coupled to the wire upon rotation. Thus, rotation simultaneously thermally, mechanically, and electrically couples remote component 10 to housing 104.

FIG. 8A illustrates electrical connector housing, generally designated 70. FIG. 8B illustrates a second embodiment of electrical connector housing, generally designated 140. In one aspect, electrical connectors illustrated in FIGS. 8A and 8B can comprise solder-free IDC connectors of a custom design or designs available on the market can be used. Electrical connector housing 70 comprises an opening 78 of housing portion 74. A portion of body 12 can be disposed within hollowed center 72 of connector housing 70. This thicker body portion can advantageously comprise an effective heat transfer material, or heatsink, which can thermally couple over housing 104 to readily dissipate heat through body to one or more fins 110 (FIG. 5) of housing. Opening 78 can substantially align with opening 94 of locking member 90. A wire can be disposed within each of openings 78 and 94. The wire can be fixedly held between each of the openings and trimmed off flush at the top of electrical connector housing 70. Upon rotation, an aperture 86 of electrical connector 80 can slidably move over locking member 90 and engage the wire. Upper surfaces 86 of aperture 84 can displace insulation from and upper portion of wire. Lower surfaces 88 of aperture 84 can displace the insulation from a bottom portion of wire. Upper and lower surfaces 86 and 88, respectively, can make electrical contact with the conductive portion of wire, and electrically communicate with wire and rivet 22. In one aspect, the rotation force causes upper and lower surfaces 86 and 88 to cut into the insulation and electrically communicate with the exposed conductive wire. During rotation, housing portion 72 can fixedly engage stepped portion 92 of locking member 90 such that it can hold the wire stationary allowing electrical connector 80 to make electrical contact with the wire.

Similarly, electrical connector housing 140 of FIG. 8B can comprise a housing portion 142. Housing portion 142 can comprise a groove 144 substantially aligned over opening 94 of locking member 90. Groove 144 can fixedly hold a wire between opening 94. A portion of body 12 can be disposed within a hollowed center 146 of connector housing 140. This thicker body portion can advantageously comprise an effective heat transfer material, or heatsink, which can thermally couple over housing 104 to readily dissipate heat through body 12 to one or more fins 110 (FIG. 5) of housing. Similar to FIG. 8A, electrical connector 80 can slidably move over locking member 90 and engage the wire. Upper surfaces 86 of aperture 84 can displace insulation from and upper portion of wire. Lower surfaces 88 of aperture 84 can displace the insulation from a bottom portion of wire. In one aspect, upper and lower surfaces 86 and 88, respectively bite or otherwise cut into the insulation surrounding the conductive wire to expose and electrically communicate with wire. Upper and lower surfaces 86 and 88, respectively, can make electrical contact with the conductive portion of wire, and electrically communicate with wire and rivet 22. During rotation, housing portion 142 can fixedly engage stepped portion 92 of locking member 90 such that it can hold the wire stationary allowing electrical connector 80 to make electrical contact with the wire.

Figure 9:
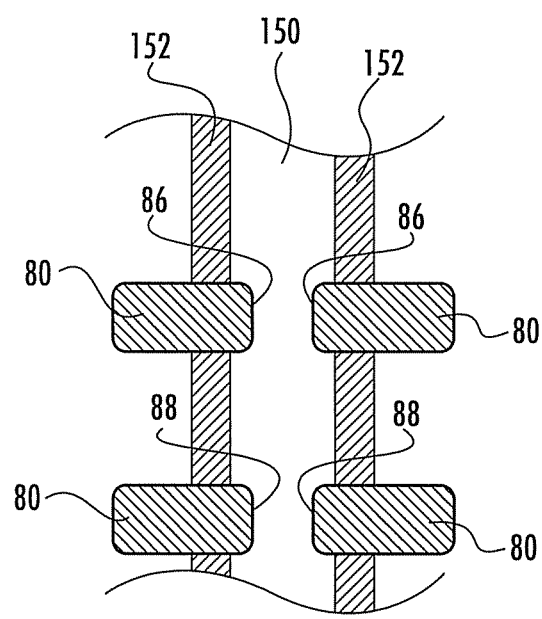
FIG. 9 is a schematic illustration of a wire disposed within an electrical connector of remote component devices and systems according to an embodiment of the present subject matter.

FIG. 9 illustrates a cross-sectional view of electrical connector 80 along line 9-9 of FIGS. 8A and 8B. Electrical connector 80 can comprise an IDC contact. In FIG. 9 a cross-section of conductive wire 150 is as fixedly held vertical with respect to electrical connector 80. Conductive wire 150 can be covered with and insulating covering 152. When remote component 10 rotates, electrical connector 80 can slide over locking member 90 and pierce conductive wire 150. Electrical connector 80 makes electrical contact with the conductive wire 150 when rotation causes it to displace insulating covering 152. For example, conductive wire 150 can be directly contacted by upper and lower surfaces 86 and 88, respectively, of electrical connector 80 upon rotation. When rotated, electrical connector 80 can electrically communicate with conductive wire 150 and transfer electrical current to the LEDs 18 using rivet 22. Rotation can electrically link remote component 10 to circuit 106 of housing 104. As noted earlier, electrical conductor can comprise any suitable electrically conductive material. Notably, an IDC contact is solder-free which improves handling and ease of use and manufacturing of devices and/or components as described herein. In addition, no manual stripping of wires prior to soldering is necessary, as the IDC contact strips the wires upon rotation.

Figure 10:
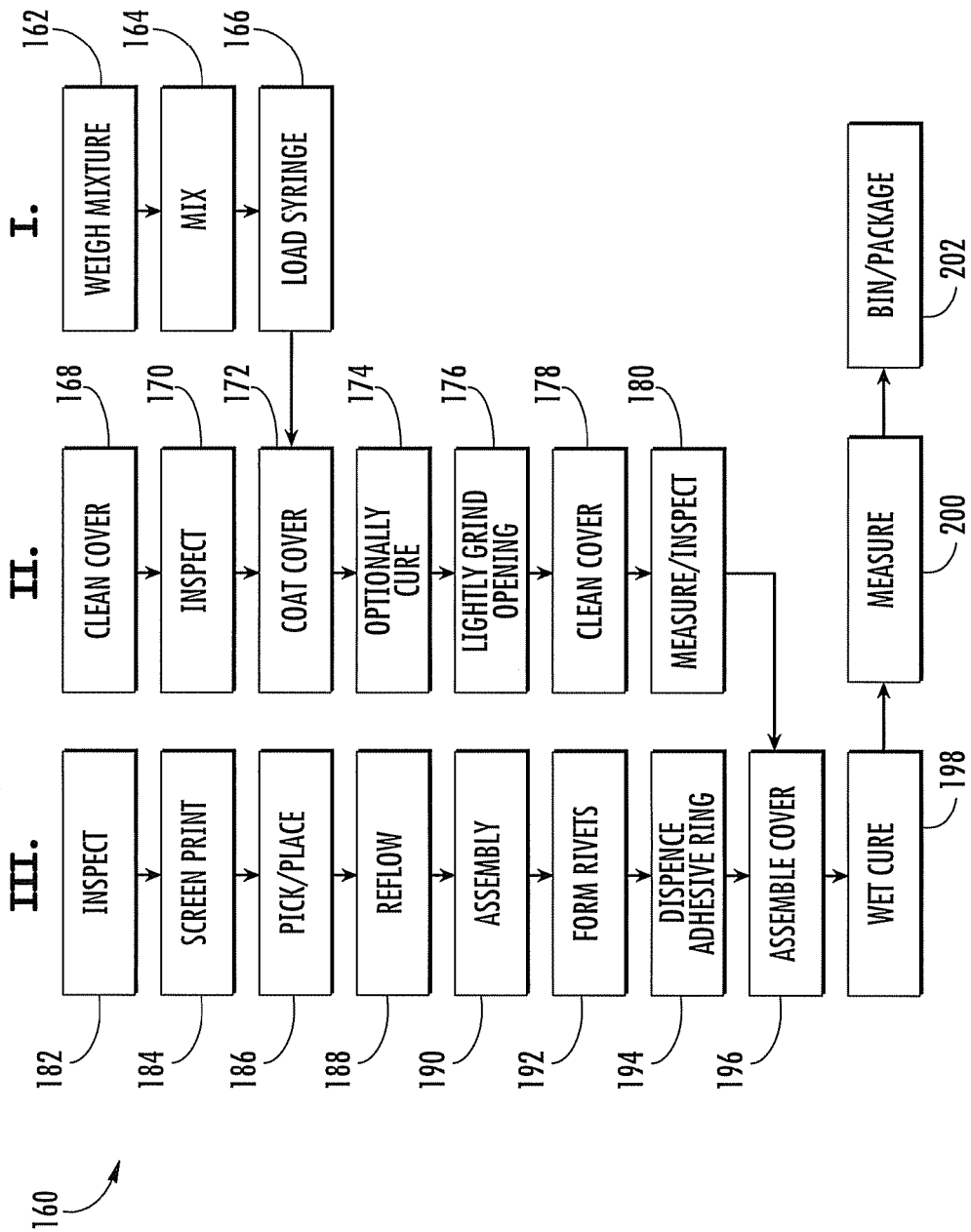
FIG. 10 is a flow chart according to a method for assembling remote component devices according to an embodiment of the present subject matter.

FIG. 10 is a flow chart illustrating a method of assembling light emitting devices 10 described herein. As FIG. 10 illustrates, the method can comprise three different sub-methods designated I, II, and III each of which can comprise one or more steps performed before and/or simultaneous with the steps of the preceding sub-method. That is, steps 168 and 170 of sub-method II can be performed before and/or simultaneous with the steps of sub-method I. Similarly, steps 182-194 of sub-method III can be performed before and/or simultaneous with the steps of sub-methods I and/or II.

First sub-method I can comprise preparing the optical material located remotely from the one or more LEDs. For example, a first step in preparing the optical material can comprise step 162 which can be to weigh the mixture used for the optical material. The mixture can be mixed at step 164 and loaded in a syringe at step 166. Sub-method II can comprise preparing the cover, for example cover 14 (FIG. 1) to which the optical material can adhere and/or attach to. For example, the cover can be cleaned at step 168 and inspected at step 170. At step 172 the optical material prepared according to sub-method I can be applied to the prepared cover. For example, in one aspect the optical material prepared in sub-method I can be coated at step 172 onto the cover. In one aspect, the optical material can be spray coated to an inner and/or outer surface of the cover 14. However, any coating method can be used, for example not limited to brushing, molding, dipping, adhering, encapsulating, or any other suitable method. The cover can be optionally cured according to step 174 and the opening of cover can be lightly grinded in step 176. The cover can be cleaned at step 178 and measured and/or inspected at step 180. In one aspect, optical properties of the cover can be measured, and the cover can be inspected for optical and/or physical defects.

Still referring to FIG. 10, sub-method III can include steps of preparing the body 12 prior to attaching cover 14 (FIG. 1). For example, the body can be inspected at step 182 and screen printed at step 184. In one aspect, the solder mask can be screen printed over the mounting substrate for improved light reflection and/or other improved optical properties. LEDs and/or LED packages can be picked and placed at step 186. The body, including the connector, insulating portion and LEDs or LED packages can be heated for example, by reflowing at step 188. The body can be assembled at step 190 to locking member. Rivets can be formed at step 192. In one aspect, rivets can be pressed. An adhesive ring can be dispensed at step 194 about inner wall of body, for example, inner wall 30 (FIG. 1) for securely attaching to cover. The cover can be assembled to the body at step 196 by positing the cover over inner wall with the adhesive disposed therebetween. The cover can be wet cured to the body at step 198. The remote component is now assembled and can be measured at step 200. Optical, physical and/or electrical properties can be measured at step 200. The remote component can be binned according to its optical properties and/or packaged at step 202. In one aspect, remote component can be packaged as is for shipping to customers to use in customer-specific component designs. Or remote component can be packaged for shipping to be used alone or in other lighting products. In other aspects, remote component can be packaged within a housing, for example, housing 104 for use in an A19 equivalent light bulb system as described herein. Remote component devices can be used alone and/or in combination with any other suitable components forming remote component systems thereof.

Figure 11:
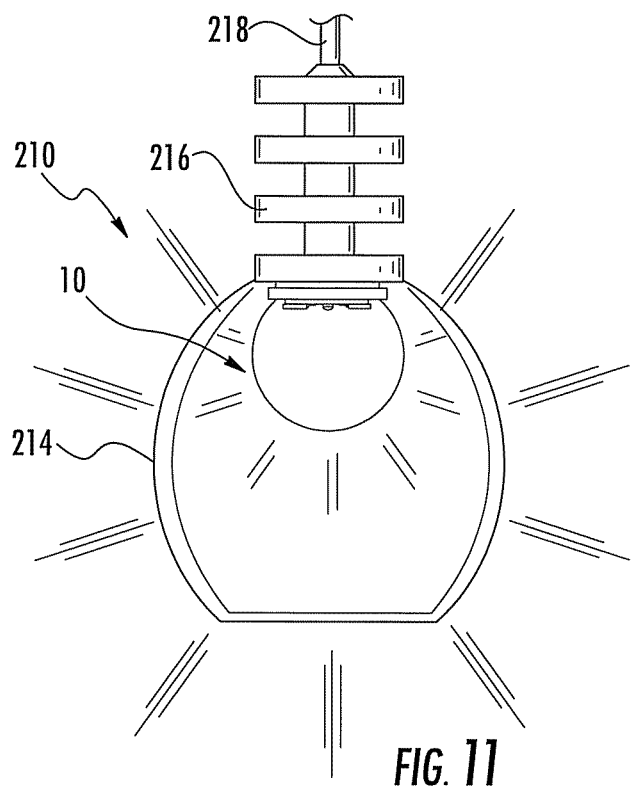
FIG. 11 is a cross-sectional view of a lighting device with remote component device according to an embodiment of the present subject matter.
Figure 12:
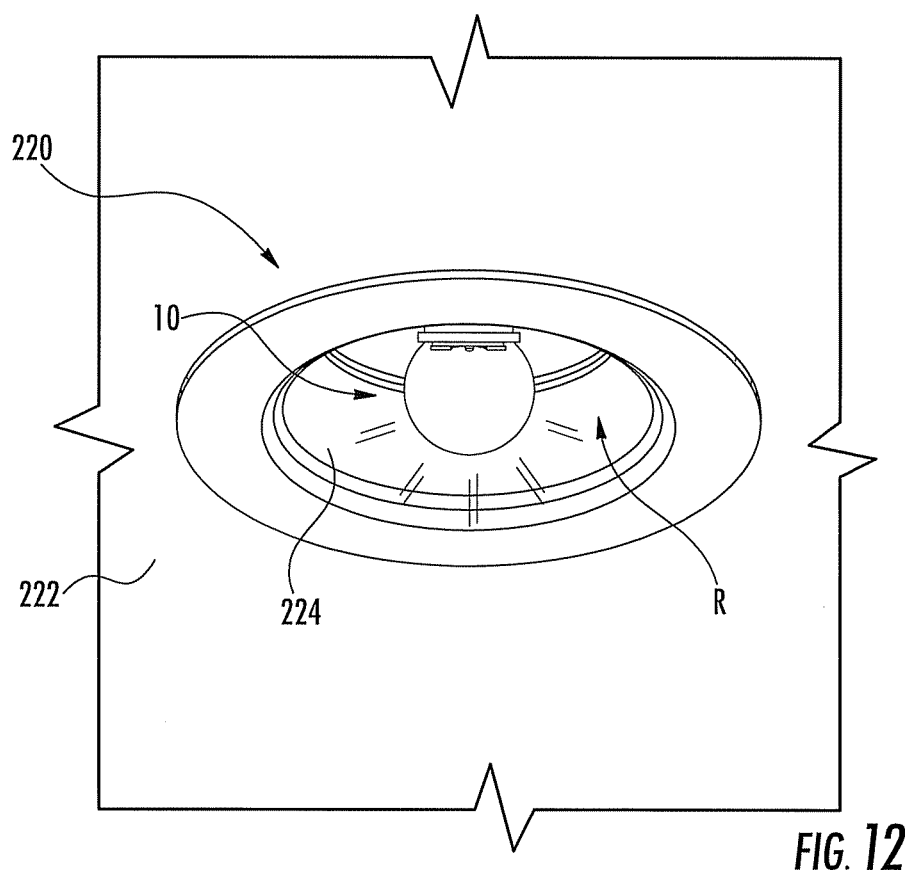
FIG. 12 is a perspective view of a lighting device with remote component device according to an embodiment of the present subject matter.

FIGS. 11 and 12 illustrate lighting products, or devices utilizing remote component devices 10. For example, remote component devices 10 as described herein can be used alone in lighting products or used as a system in lighting products. Such systems can comprise, for example, A19 equivalent light bulb and systems previously described. Remote component systems are not limited to A19 equivalent bulbs, but can comprise any suitable system. FIG. 11 illustrates a remote component 10 used in a lighting device 210. Lighting device 210 can comprise a decorative lamp for use in down lighting applications. Lighting device 210 can comprise a decorative cover 212 and a thermal element 216. Thermal element can be thermally coupled to remote component 10 and can dissipate heat from remote component 10 into the ambient air. Thermal element 216 can comprise a housing for mechanically coupling to remote component 10. Notably, remote component can be used alone, and not contained within another bulb, such as bulb 102 (FIG. 5). Remote component 10 can be secured within thermal element, for example, lockably secured as described earlier. Remote component 10 can electrically, thermally, and mechanically couple within device 210 to thermal element 216, as electrical current can at least partially be transferred through thermal element 216 to remote component 10 using electrical wire 218. Remote component 10 can comprise omnidirectional light emission, which in turn, can produce omnidirectional lighting from lighting device 210.

FIG. 12 illustrates another example of a lighting product using remote component 10. FIG. 12 illustrates a recessed light, generally designated 220. Recessed light 220 can be installed, for example, from a ceiling 222. Recessed light 220 can comprise a recess R in which remote component 10 can be lockably secured, and from which remote component 10 can emit light. Remote component 10 can be used alone, or as a system within recessed light 220. At least a portion of recessed light 220 can comprise a housing for receiving remote component 10. Remote component 10 can electrically, thermally, and mechanically couple within recess R to other components (not shown) of recessed light 220. Remote component 10 can emit omnidirectional light which can be reflected and directed down at least partially, for example, by reflective inner wall 224. Remote component 10 can be used either alone and/or in combination within a system in any suitable lighting device, or product. Embodiments herein have been used for illustration purposes. Any lighting product device or system is hereby contemplated.

In sum, remote component devices can be used as a lighting product to illuminate lighting devices either alone or in combination within systems targeted at replacing standard filament and CFL bulbs. Remote component devices and systems can comprise easy to use twist-lock lighting products having omnidirectional light emission. Customers and/or consumers can simply insert remote components and twist, and the devices and/or systems are ready to use. Customers and/or consumers can easily fit remote components described herein into A19 equivalent bulbs and/or easily design and assemble A19 lamps, or other LED products using components described herein. Tedious stripping and soldering of electrical components can be eliminated. In one aspect, the remote component devices, systems, and methods herein can thermally, electrically, and mechanically couple with one simple rotation or twisting motion. Additional optics or components can be installed and/or used with remote component devices, systems, and methods as specified by the manufacturer and/or consumer. While the subject matter has been has been described herein in reference to specific aspects, features and illustrative embodiments of the subject matter, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein. Correspondingly, the subject matter as hereinafter claimed is intended to be broadly construed and interpreted, as including all such variations, modifications and alternative embodiments, within the scope of this disclosure.

What is claimed is:

1. A remote component for providing light, the remote component comprising:
   a body attachable and detachable with respect to a housing for rotatably coupling the remote component to the housing;
   one or more light emitting devices supported by the body;
   a cover retained by a portion of the body, wherein the one or more light emitting devices are disposed on a planar surface of the body, which is at least partially above a portion of the cover, for emitting light both above and below the cover; and
   a phosphor material disposed on the cover and remotely located at least a first distance away from the one or more light emitting devices for affecting light emitted from the one or more light emitting devices.

2. The remote component of claim 1 wherein the one or more light emitting devices comprise one or more light emitting diodes (LEDs).

3. The remote component of claim 1, wherein the light emitting devices comprise at least one or more blue, green, and/or red light emitting diode (LED) chips.

4. The remote component of claim 1 wherein the phosphor material is coated on an inner or an outer surface of the cover.

5. The remote component of claim 1 comprising light emitting devices adapted for a light emission having a minimum of approximately 80 CRI for white color points.

6. The remote component of claim 1 comprising light emitting devices adapted for a light emission having a minimum of approximately 90 CRI for white color points.

7. The remote component of claim 1 comprising light emitting devices adapted for a light emission of at least approximately 800 lumens (lm) or more at approximately 12.5 W of power or less.

8. The remote component of claim 1 wherein the housing is a portion of an A19 equivalent light bulb.

9. The remote component of claim 1 wherein the one or more light emitting devices receive electrical signal transferred at least partially from a lower connector upon rotation of the body.

10. The remote component of claim 9 wherein the lower connector comprises an insulation displacement connector (IDC).

11. The remote component of claim 10 wherein the IDC is adapted for simultaneously mechanically and thermally coupling the body to the housing upon rotation.

12. The remote component of claim 1 wherein the first distance is 1 or more millimeters (mm).

13. The remote component of claim 1 wherein the remote component is adapted for emitting light from the cover omnidirectionally.

14. A remote component for providing light, the remote component comprising:
   a body attachable and detachable with respect to a housing for rotatably coupling the remote component to the housing;
   one or more light emitting devices supported by the body, the one or more light emitting devices configured to receive electrical signal transferred at least partially from a lower connector upon rotation of the body;
   a cover retained by a portion of the body, wherein the one or more light emitting devices are disposed on a planar surface of the body, which is at least partially above a portion of the cover, for emitting light both above and below the cover; and a phosphor material disposed on the cover and remotely located at least a first distance away from the one or more light emitting devices.

15. The remote component of claim 14 wherein the one or more light emitting devices comprise one or more light emitting diodes (LEDs).

16. The remote component of claim 14, wherein the light emitting devices comprise one or more blue, green, and/or red light emitting diode (LED) chips.

17. The remote component of claim 14 wherein the phosphor material is coated on an inner or an outer surface of the cover.

18. The remote component of claim 14 comprising light emitting devices adapted for a light emission having a minimum of approximately 80 CRI for white color points.

19. The remote component of claim 14 comprising light emitting devices adapted for a light emission of at least approximately 800 lumens (lm) or more at approximately 12.5 W of power or less.

20. The remote component of claim 14 wherein the housing is a portion of an A19 equivalent light bulb.

21. The remote component of claim 14 wherein the lower connector comprises an insulation displacement connector (IDC).

22. The remote component of claim 21 wherein the IDC is adapted for simultaneously mechanically and thermally coupling the body to the housing upon rotation.

23. The remote component of claim 14 wherein the first distance is 1 or more millimeters (mm).

24. The remote component of claim 14 wherein the remote component is adapted for emitting light from the cover omnidirectionally.

25. A remote component system for providing light, comprising:
a remote component comprising:
a body;
one or more light emitting devices supported by the body; and
an optical material remotely located at least a first distance away from the one or more light emitting devices;
a housing for receiving the body; and
wherein the remote component includes a lower connector adapted for thermally, electrically, and mechanically connecting the remote component to the housing upon rotation of the body.

26. The remote component system of claim 25 wherein the system comprises an A19 equivalent light bulb.

27. The remote component system of claim 25 comprising light emitting devices adapted for a light emission of at least approximately 800 lumens (lm) or more at approximately 12.5 W of power or less.

28. The remote component system of claim 25 wherein the one or more light emitting devices comprise one or more light emitting diodes (LEDs).

29. The remote component system of claim 28 wherein the optical material comprises a phosphor material.

30. The remote component system of claim 29 wherein the remote component further comprises a cover disposed over the one or more LEDs, and wherein the phosphor material is disposed on the cover.

31. The remote component system of claim 30 wherein the phosphor material is coated on an inner or an outer surface of the cover.

32. The remote component system of claim 25 comprising a light emission having a minimum of approximately 80 CRI for white color points.

33. The remote component system of claim 31 wherein the lower connector comprises an insulation displacement connector (IDC).

34. The remote component system of claim 25 wherein the first distance is 1 or more millimeters (mm).

35. The remote component system of claim 25 further comprising a bulb disposed over a cover of remote component.

36. The remote component system of claim 30 wherein the light emitting devices are configured for emitting light from the cover omnidirectionally.

37. The remote component system of claim 35 wherein the remote component system is configured for emitting light from the bulb omnidirectionally.

38. A method of providing a lighting device, comprising:
providing a remote component comprising:
a body attachable and detachable with respect to a housing for coupling the remote component to the housing;
one or more light emitting devices supported by the body;
a cover retained by a portion of the body, wherein the one or more light emitting devices are disposed on a planar surface of the body, which is at least partially above a portion of the cover, for emitting light both above and below the cover; and
a phosphor material disposed on the cover and remotely located at least a first distance away from the one or more light emitting devices; and
rotating the body of the remote component against a portion of the housing to attach the body to the housing.

39. The method of claim 38 wherein providing one or more light emitting devices comprises providing one or more light emitting diodes (LEDs) disposed over the body.

40. The method of claim 38, wherein the one or more light emitting devices comprising at least one blue, green, or red light emitting diode (LED) chip.

41. The method of claim 38 wherein the method further comprises coating the phosphor material on an inner or an outer surface of the cover.

42. The method of claim 38 further comprising illuminating the one or more light emitting devices, whereby a light emission of the one or more light emitting devices comprises a minimum of approximately 80 CRI for white color points.

43. The method of claim 38 further comprising illuminating the one or more light emitting devices, whereby a light emission of the one or more light emitting devices comprises a minimum of approximately 90 CRI for white color points.

44. The method of claim 43 whereby the light emission comprises at least approximately 800 lumens (lm) or more at approximately 12.5 W of power or less.

45. The method of claim 43 whereby the light emission is omnidirectional.

46. The method of claim 38 wherein rotating the body comprises moving a lower connector to electrically connect to the one or more light emitting devices.

47. The method of claim 46 wherein the lower connector comprises an insulation displacement connector (IDC).

48. The method of claim 47 wherein moving the IDC mechanically and thermally couples the body to the housing upon rotation.

49. A method of providing a remote component system comprising:
providing a remote component comprising:

a body;

one or more light emitting devices supported by the body;

an optical material remotely located at least a first distance away from the one or more light emitting devices;

a lower connector adapted for thermally, electrically, and mechanically connecting the remote component to the housing upon rotation of the body;

providing a housing for receiving the body, wherein the housing comprises a portion of a light bulb, and wherein the body of the remote component is attachable and detachable with respect to the housing upon rotation of the body against a portion of the housing; and attaching the remote component to the housing whereby the remote component is mechanically and electrically coupled to the housing.

50. The method of claim 49 wherein attaching the remote component comprises rotating the remote component with respect to the housing.

51. The method of claim 49 whereby the remote component thermally couples to the housing upon attachment.

52. The method of claim 49 wherein providing the remote component comprises positioning the optical material at least the first distance away from one or more light emitting diodes (LEDs), the first distance comprising 1 or more millimeters (mm).

53. The method of claim 49 further comprising attaching a bulb over the remote component.

54. An A19 equivalent light bulb provided using the method of claim 49.

55. The method of claim 49 further comprising illuminating the one or more light emitting devices, whereby a light emission of the one or more light emitting devices comprises a minimum of approximately 80 CRI for white color points.

56. The method of claim 55 whereby the light emission comprises at least approximately 800 lumens (lm) or more at approximately 12.5 W of power or less.

57. The method of claim 55 whereby the light emission is omnidirectional.

58. A remote component for providing light, the remote component comprising:

a body attachable to a housing for attaching the remote component to the housing;

one or more light emitting devices supported by the body for receiving an electrical signal transferred at least partially from a lower connector upon rotation of the body, wherein the lower connector comprises an insulation displacement connector (IDC) that is adapted for simultaneously mechanically and thermally coupling the body to the housing upon rotation;

a cover retained by a portion of the body, wherein the one or more light emitting devices are disposed on a planar surface of the body, which is at least partially above a portion of the cover, for emitting light both above and below the cover; and a phosphor material disposed on the cover and remotely located at least a first distance away from the one or more light emitting devices for affecting light emitted from the one or more light emitting devices.

59. A remote component for providing light, the remote component comprising:

a body attachable to a housing portion of a light bulb for attaching the remote component to the housing;

one or more light emitting devices supported by the body, the one or more light emitting devices configured for receiving an electrical signal transferred at least partially from a lower connector upon rotation of the body, wherein the lower connector comprises an insulation displacement connector (IDC) that is adapted for simultaneously mechanically and thermally coupling the body to the housing portion of the light bulb upon rotation;

a phosphor material remotely located at least a first distance away from the one or more light emitting devices.

60. A method of providing a lighting device, comprising:

providing a remote component comprising:

a body attachable to a housing portion of a light bulb for attaching the remote component to the housing portion;

one or more light emitting devices disposed over the body;

an optical material remotely located at least a first distance away from the one or more light emitting devices; and attaching the body of the remote component to the housing portion of the light bulb by rotating the body against the housing portion, such that rotating the body comprises moving a lower connector to electrically connect to the one or more light emitting devices, the lower connector including an insulation displacement connector (IDC).

61. The method of providing a lighting device of claim 60, wherein moving the IDC mechanically and thermally couples the body to the housing upon rotation.

* * * * *